(12) United States Patent
Beall et al.

(10) Patent No.: US 6,689,707 B1
(45) Date of Patent: Feb. 10, 2004

(54) LOW THERMAL EXPANSION CALCIUM ALUMINATE ARTICLES

(75) Inventors: Douglas M. Beall, Painted Post, NY (US); Shahid G. Lakhwani, Painted Post, NY (US); Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/405,681

(22) Filed: Apr. 1, 2003

(51) Int. Cl.$^7$ .................. C04B 35/057; C04B 35/111
(52) U.S. Cl. .................. 501/123; 501/125; 501/127; 264/630
(58) Field of Search .................. 501/123, 124, 501/125, 127; 264/630

(56) References Cited

U.S. PATENT DOCUMENTS

| | | | | |
|---|---|---|---|---|
| 3,312,558 A | * | 4/1967 | Miller | 501/125 |
| 3,969,542 A | * | 7/1976 | Tomita et al. | 502/250 |
| 4,204,878 A | * | 5/1980 | Nudelman et al. | 106/693 |
| 4,960,737 A | | 10/1990 | Guile et al. | 501/124 |
| 5,374,392 A | * | 12/1994 | Skelcey et al. | 419/49 |

FOREIGN PATENT DOCUMENTS

JP 2-160661 * 6/1990

OTHER PUBLICATIONS

S. Jonas et al.., *A New Non–silicate Refractory of Low Thermal Expansion*, Ceramics International 24, 211–216 (1998), no month.
S. Jonas et al., *Low Thermal Expansion Refractory Composites Based on* $CaAl_4O_7$, Ceramics International 25, 77–84 (1999), no month.
Y. Suzuki et al., *In Situ Synthesis and Microstructure of Porous* $CaAl_4O_7/CaZrO_3$ *Composite*, J. Ceram. Soc. Japan 109, 205–209 (2001), no month.
R. D. Shannon et al., *Effective Ionic Radii in Oxides and Fluorides*\*, Acta Cryst. 925–946 (1969), no month.

\* cited by examiner

*Primary Examiner*—Karl Group
(74) *Attorney, Agent, or Firm*—Anca C. Gheorghiu; Scott Servilla

(57) ABSTRACT

Compositions, articles and methods for making such articles are disclosed. The compositions, articles and methods include calcium aluminate materials consisting essentially of a main phase of $CaAl_4O_7$ and having a low coefficient of thermal expansion produced by utilizing an additive and firing to temperatures below about 1600°0 C.

14 Claims, 1 Drawing Sheet

LOW THERMAL EXPANSION CALCIUM ALUMINATE ARTICLES

FIELD OF THE INVENTION

This invention relates to calcium aluminate compositions, articles made from these compositions and methods of making such articles. More particularly, the invention relates to low thermal expansion calcium aluminate compositions and articles and methods of making low expansion articles.

BACKGROUND OF THE INVENTION

Low thermal expansion ceramic bodies are desirable in a wide variety of applications. For example, low expansion bodies have been used as filters for fluids, in particular, as diesel particulate filters and as substrates for catalytic converters, an example of which is known in the art as a honeycomb substrate. Additionally, low thermal expansion bodies are desirable in applications where the thermal shock resistance and the ultimate use temperature are high. Substrates used under conditions of high thermal gradients are examples of this application. For example, structures such as honeycomb and cellular substrates are subjected to harsh environments, which require high thermal shock resistance, low thermal expansion, and high mechanical shock properties. Maintaining these properties for extended periods of time in their intended environments eliminates many potentially useful refractory materials.

Cordierite substrates, typically in the form of a honeycomb body, have long been preferred for use as substrates to support catalytically active components for catalytic converters on automobiles, in part due to high thermal shock resistance of cordierite ceramics. The thermal shock resistance is inversely proportional to the coefficient of thermal expansion. That is, honeycombs with a low thermal expansion have a good thermal shock resistance and can survive the wide temperature fluctuations that are encountered in the application. Manufacturers work continuously to optimize the characteristics of cordierite substrates to enhance their utility as catalyst carriers. Specifically, manufacturers continually strive to optimize the thermal shock resistance and other properties of the cordierite substrates.

Another property of certain types of catalysts is the ability to purify exhaust gases and the ability to convert carbon monoxide, hydrocarbons and nitrogen oxides ($NO_x$) produced during engine operation into less environmentally harmful gases. Some catalyst systems utilize alkali metals contained on the catalyst support store nitrogen oxides, and such catalysts are referred to in the art as $NO_x$ adsorbers. A disadvantage of presently available catalyst and purification systems is that most of the alkali metals contained on the catalyst support for storing $NO_x$ readily react with cordierite within the temperature range of interest for $NO_x$ adsorber use. For example, potassium, a widely used alkali adsorber material, appears to readily react with cordierite, which draws the potassium out of the high surface area washcoat and prevents it from performing its adsorber function. Furthermore, the potassium reacts with cordierite to form relatively high coefficient of thermal expansion (CTE) phases that make the substrate and the catalyst system much less thermal shock resistant.

There is a need to provide alternative low CTE materials that are useful in high temperature applications. It would be desirable to provide materials that have a low CTE and excellent thermal shock resistance.

SUMMARY OF THE INVENTION

One embodiment of the invention relates to a ceramic article and methods of forming a ceramic article consisting essentially of a main phase of $CaAl_4O_7$ and an additive which forms binary eutectic or lower melting component with the main phase when fired to a temperature of less than about 1600° C. and exhibiting a CTE of less than about $25 \times 10^{-7}$/° C. over the temperature range of about 25° C. to 800° C. Other embodiments relate to a calcium aluminate article and a method of forming the article consisting essentially of a main phase of CA2 and an additive, the article having a thermal expansion less than about $20 \times 10^{-7}$/° C. over the temperature range 25° C. to 800° C., preferably less than about $15 \times 10^{-7}$/° C. over the temperature range 25° C. to 800° C. In certain embodiments, the articles contain a network of microcracks and include grains having a median grain size of between about 10 microns and 100 microns. The articles of the present invention can be used in a wide variety of applications, including but not limited to manufacturing honeycomb substrates for high temperature applications and honeycomb substrates for $NO_x$ adsorption applications.

It is to be understood that both the foregoing general description and the following detailed description are exemplary and are intended to provide further explanation of the invention as claimed.

DETAILED DESCRIPTION

Figure 1:
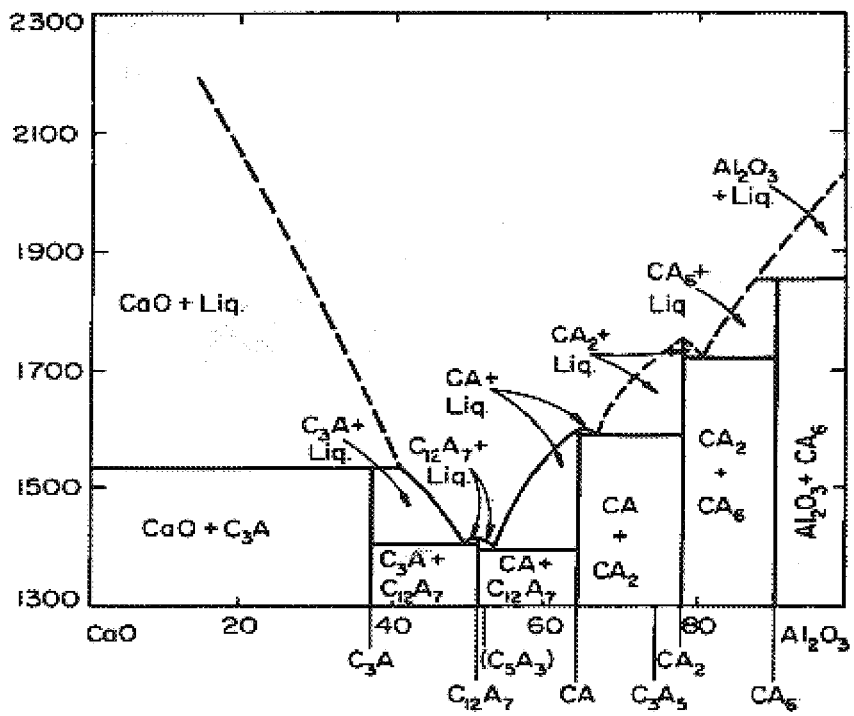
FIG. 1 is a phase diagram of $CaO-Al_2O_3$.

Before describing several exemplary embodiments of the invention, it is to be understood that the invention is not limited to the details of construction or process steps set forth in the following description. The invention is capable of other embodiments and of being practiced or carried out in various ways.

The various embodiments of the present invention provide materials, methods and articles having low coefficients of thermal expansion. Copending and commonly assigned U.S. patent application Ser. Nos. 10/255,732, filed on Sep. 25, 2002, SP02-098) and 10/255,725, filed on Sep. 25, 2002, the contents of which are incorporated herein by reference, disclose low thermal expansion calcium aluminate compositions that include a major phase of $CaAl_4O_7$ (Grossite or calcium dialuminate or CA2) and a minor phase of $CaAl_2O_4$ (calcium monoaluminate or CA). These CA2-based compositions can provide thermal expansions of less than $20 \times 10^{-7}$/° C., but these materials contain a significant amount of CA (calcium monoaluminate, or $CaAl_2O_4$) in addition to the CA2 phase. Because the CA phase has much higher reactivity with water and is more readily hydrated than is CA2, causing the formation of undesirable high-expansion hydrate phases, it is greatly preferred that CA be kept to a minimum for applications requiring low thermal expansion. The ability to obtain low thermal expansion in a phase assemblage devoid of CA is therefore of considerable benefit. However, a study of the calcium oxide-alumina phase diagram shows that that to obtain a fired body that contains substantially no CA phase, the body must be fired to temperatures above 1700° C. It would be desirable to obtain a calcium aluminate body having substantially no CA phase without having to fire to such high temperatures.

Applicants have discovered that additives to the CA2 stoichiometry can provide a number of potential benefits.

According to some embodiments, additions of other oxides, including, but not limited to, $ZrO_2$, $K_2O$, $Li_2O$, and $B_2O_3$, or fluorides such as $CaF_2$, can serve as potent fluxes and allow sintering with optimal grain growth at lower temperatures. Achieving optimal grain growth is very important toward obtaining ultra-low thermal expansion in these materials, because if the grains are too small, there will be insufficient microcracking and thermal expansion of the material will be higher. Generally no more than about 10 mole percent of these other oxides or fluorides are required, as higher levels typically result in the crystallization of secondary, high-expansion phases.

In preferred embodiments, the addition of $ZrO_2$ to the composition and firing the compositions to temperatures below 1600° C., and more preferably below 1550° C., provides bodies having a main phase of CA2 and a minor phase of $CaZrO_3$. Such bodies exhibit thermal expansions of less than about $25 \times 10^{-7}$/° C. from about 25° C. to about 800° C., and more preferably, less than about $20 \times 10^{-7}$/° C. from about 25° C. to about 800° C.

Figure 2:
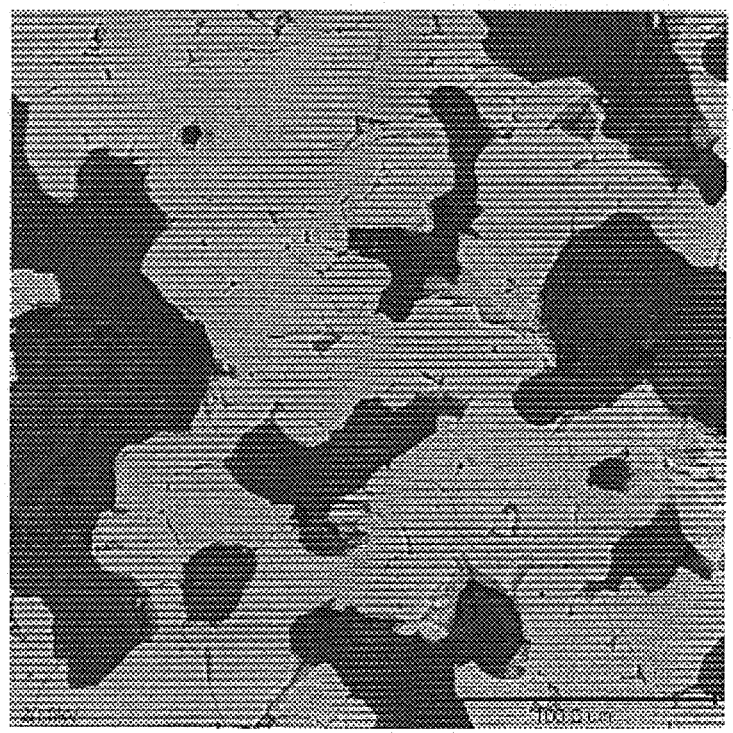
FIG. 2 is a photograph showing the microstructure of a calcium aluminate article consisting essentially of a main phase of CA2 after firing with an additive according to one embodiment of the invention.

As noted above, by providing an additive of the present invention, articles consisting essentially of a main phase of CA2 exhibit a microstructure having an average grain size between 10 microns and 100 microns that does not require firing to temperatures exceeding 1700° C. For example, FIG. 2 shows the microstructure obtained from this sample, which resulted in a CA2 main phase that comprises 95% by weight CA2 component and 5% $KAlO_2$ component. The ceramic was mixed using calcium and potassium carbonates and alumina (77.1 weight percent alumina, 20.5 weight percent CaO and 2.4 weight percent $K_2O$) and fired at 1550° C. for 6 hours. The thermal expansion coefficient of this ceramic was $17 \times 10^{-7}$/° C. from about 25° C. to about 800° C., and its X-ray diffraction pattern shows CA2 as the sole crystal phase. The addition of the $K_2O$ aids in obtaining this low an expansion at a temperatures as low as 1550° C., because without an additive such as $K_2O$ there would be insufficient grain growth for good microcracking, and the thermal expansion coefficient would be closer to $50 \times 10^{-7}$/° C. Similarly, there can be advantages in tailoring the chemistry of the CA2 phase itself. The hydration potential (reactivity with water) of calcium aluminates increases with calcium content, i.e. as the $CaO/(CaO+Al_2O_3)$ increases. While CA2 is therefore considered relatively unreactive as a cement material, the possibility of its hydration nonetheless exists and could pose a problem for certain applications. Lowering the amount of calcium in CA2 by the substitution of other, non-hydrating cations would lower the overall hydration potential of the material.

Stoichiometric CA2 contains 21.6% CaO and 78.4% $Al_2O_3$ by weight. It is probable that this structure, like nearly all crystal structures, is compatible with some amount of chemical substitution, whereby some percentage of other cations can substitute for the calcium and aluminum ions in the CA2 structure. The most common cation substitutions for $Ca^{2+}$ include the other divalent alkaline earth cations, particularly $Mg^{2+}$ and $Sr^{2+}$, as well as monovalent and trivalent cations that are close in size to $Ca^{2+}$, particularly $Na^+$ and $y^{3+}$. Other cation substitutions include, but are not limited to, $Na^+$, $Y^{3+}$, $Al^{3+}$, $Fe^{3+}$, $Si^{4+}$, $Ge^4$ , and $Zn^{2+}$. The substitution of $Na^+$ or $Y^{3+}$ for $Ca^{2+}$ would require a paired substitution in order to achieve charge balance in the structure. Numerous pairs would be possible, including:

(i) $Na^+$ and $Y^{3+}$ for $2Ca^{2+}$ (ii) $Na^+ + Si^{4+}$ for $Ca^{2+} + Al^{3+}$ (i.e. $Si^{4+}$ for $Al^{3+}$ in a tetrahedral site)

(iii) $2Y^{3+}$+vacancy for $3Ca^{2+}$

The most common substitutions for $Al^{3+}$ in the tetrahedral sites would include $Si^{4+}$, $Fe^{3+}$, $Ge^{4+}$, and $Zn^{2+}$. The large, distorted calcium polyhedron, with its five short and two longer Ca—O bonds, would appear to be particularly amenable to chemical substitution. A larger cation such as $Sr^{2+}$ would likely reside closer to the center of the polyhedron and give seven longer, more equivalent Sr—O bonds, while a smaller cation such as $Mg^{2+}$ would likely produce more "distortion" of the polyhedron toward six-coordination. In fact, the phase $SrAl_4O_7$ (SA2) does indeed exist and is isostructural with CA2, and the phase equilibrium diagram of $SrO—Al_2O_3$ is remarkably similar to that of $CaO—Al_2O_3$, as shown in FIG. 1. It is possible that complete solid solution could exist between CA2 and SA2.

The materials of the present invention can be synthesized using conventional high-temperature sintering of raw or pre-reacted materials. Firing temperatures range from 1450° to 1600° C., but are preferably less than 1600° C., and more preferably less than about 1550° C. The general method of producing the articles of the present invention includes mixing the appropriate batch materials, preferably materials having an average particle diameter of less than about 150 microns. In certain embodiments, the average particle diameter of the starting powders is less than about 50 microns, and in alternative embodiments, the average particle diameter is less than about 15 microns. The mixed powders are then blended and then formed by extrusion or other appropriate forming methods into a green article, for example, a honeycomb body. The article is then subsequently sintered to a hard porous structure. Various lubricants and organic binders such as methylcellulose are added to the batch during the mixing step to provide viscosity control and strength prior to firing and to provide porosity to the structure after firing. Porosity is also governed by the raw materials and the firing temperature. Higher firing temperatures result in lower porosity structures. The actual firing temperature will depend on the stoichiometry of the ceramic body.

The compounds were formed by mixing alumina source powder, CaO source powder and an additive source powder sufficient to form a binary eutectic or lower melting component with the main CA2 phase of the material when fired to a temperature of less than about 1600° C., and preferably less than about 1550° C. The actual firing temperature will depend on the composition of the body. Examples of CaO source powders include calcium carbonate, calcium oxalate, calcium fluoride and calcium dihydroxide powders. Although calcium oxide can be used in its pure state, one skilled in the art will recognize that pure calcium oxide is highly reactive with water, and it is thus difficult to handle and store. If calcium carbonate is used as the source powder for calcium oxide, the weight of the powder used to obtain the proper weight percent of CaO must be adjusted upward by a factor of 1.785 to reflect the desired weight equivalent of CaO. According to certain embodiments of the invention, articles were produced that had CTEs as low as about $4 \times 10^{-7}$/° C. over the temperature range of about 25° C. to 800° C.

According to one specific embodiment of the invention, substrates for catalysts systems for the purification of exhaust gases are provided, particularly for improved $NO_x$ adsorption efficiency. In certain embodiments, the substrates are resistant to alkali migration below 1000° C. and have a coefficient of thermal expansion less than about $25 \times 10^{-7}$/° C. over the temperature range of about 25° C. to 800° C. In some embodiments, the coefficient of thermal expansion is less than about $20\times10^{-7}/°$ C. over the temperature range of about 25° C. to 800° C., and in certain embodiments, the CTE of the articles are less than about $15\times10^{-7}/°$ C. over the temperature range of about 25° C. to 800° C.

Without intending to limit the invention in any manner, the present invention will be more fully described by the following examples.

EXAMPLES

Inorganic powder batch mixes suitable for the formation of calcium aluminate ceramic bodies are shown in Table I and listed by weight percent. The inorganic compositions were formed by dry mixing calcium carbonate, alumina and additive source powders having an average particle size between about 0.5 and 20 microns together with a suitable binder such as cellulose ether binder, being either a methylcellulose or another cellulose ether derivative, in the range of 2–6% by weight of the inorganic components. Water is then added to the resulting batch in the range of 15–25% by weight of the inorganic components and the resulting batch is further mixed to form a plasticized ceramic batch mixture. All of the thus prepared batches were then extruded through a honeycomb die using a ram extruder to form a ceramic honeycomb structure. The formed honeycomb bodies were dried overnight and fired as indicated below Table I shows compositions including zirconia as an additive and the CTE for samples fired to 1525 C for six hours. The CTE is in units of $10^{-7}/°$ C. over the temperature range of about 25° C. to 800° C.

TABLE I

| CaCO3 | Al2O3 | ZrO2 | MgO | CTE |
|---|---|---|---|---|
| 33.54 | 63.53 | 2.93 | | 4.1 |
| 34.17 | 59.99 | 5.84 | | 9.4 |
| 34.80 | 56.47 | 8.73 | | 15.4 |
| 32.63 | 61.48 | 5.89 | | 9.2 |
| 33.35 | 57.85 | 8.80 | | 13.7 |
| 31.4 | 61.2 | 6 | 1.5 | 13.9 |

Additional experiments were run with additives shown in Table II below with the following results. The amount of each constituent is in weight percent.

TABLE II

| CaCO3 | Al2O3 | B(OH)3 | TiO2 | Firing Temperature | CTE |
|---|---|---|---|---|---|
| 32.35 | 65.94 | 1.72 | | 1550° C. | 4.10 |
| CA Cement | Al2O3 | MgO | | | |
| 80.58 | 16.5 | 1 | 2 | 1525° C. | 23.9 |
| CaCO3 | Al2O3 | TiO2 | | | |
| 35.5 | 59.5 | 5 | | 1525° C. | 13.8 |

Applicants determined that surprisingly low CTEs, less than about $25\times10^{-7}/°$ C., in some instances less than $20\times10^{-7}/°$ C., and lower than $10\times10^{-7}/°$ C. over the temperature range of about 25° C. to 800° C. can be obtained with bodies consisting essentially of a main phase of CA2 ($CaAl_4O_7$) and an additive which forms binary eutectic or lower melting component with the main phase. These low CTE materials are of use in applications where thermal shock conditions may be encountered because lower CTE values result in improved thermal shock resistance for the material. These materials will be particularly suitable in the manufacture of catalyst substrates used in automotive applications. The compositions in this range exhibited surprisingly low CTEs compared to the other examples in which no additive was provided, which were typically above $50\times10^{-7}/°$ C. and higher over the temperature range of about 25° C. to 800° C. for samples fired at 1550° C. To obtain CTEs below $25\times10^{-7}/°$ C. without an additive, the samples had to be fired above 1700° C. Additional additives that provided lower CTEs when fired to temperatures below about 1600 C included ZnO, $SnO_2$, SrO, $Y_2O_3$, $Fe_2O_3$, BaO, and other transition metal oxides.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A ceramic article consisting essentially of a main phase of $CaAl_4O_7$ and an additive which forms lower temperature melting component with the main phase when fired to a temperature of less than about 1600° C., the article exhibiting a network of microcracks and a thermal expansion of less than about $20\times10^{-7}/°$ C. over the temperature range 25° C. to 800° C.

2. The article of claim 1, wherein the article exhibits a thermal expansion of less than about $15\times10^{-7}/°$ C. over the temperature range of about 25° C. to 800° C.

3. The article of claim 1, wherein the article exhibits a thermal expansion of less than about $10\times10^{-7}/°$ C. over the temperature range of about 25° C. to 800° C.

4. The ceramic article of claim 1, wherein the additive is selected from the group comprising $ZrO_2$, $K_2O$, $Li_2O$, $B_2O_3$, $CaF_2$, MgO, $TiO_2$, ZnO, $SnO_2$, SrO, $Y_2O_3$, $Fe_2O_3$, and BaO source powders.

5. The ceramic article of claim 1, wherein the additive is present in an amount less than 10 percent by mole.

6. The ceramic article of claim 1, wherein the article includes grains having an average grain size between about 10 microns and 100 microns.

7. The ceramic article of claim 1, wherein the article is in the form of a honeycomb substrate.

8. The ceramic article of claim 7, wherein the article is a catalyst for purification of exhaust gases.

9. A method of manufacturing a calcium aluminate article consisting essentially of a main phase of $CaAl_4O_7$ which exhibits a thermal expansion of less than about $20\times10^{-7}/°$ C. over the temperature range of about 25° C. to 800° C. comprising:

(a) mixing CaO and $Al_2O_3$ source powders and an additive which forms binary eutectic with the main phase of $CaAl_4O_7$;

(b) forming an article from the mixture thereof; and, (c) firing the article to a temperature of less than 1600° C. to form a network of microcracks in the article.

10. The method of claim 9, wherein the calcium aluminate article exhibits a thermal expansion of less than about $15\times10^{-7}/°$ C. over the temperature range of about 25° C. to 800° C.

11. The method of claim 9, wherein the calcium aluminate article exhibits a thermal expansion of less than about $20\times10^{-7}/°$ C. over the temperature range of about 25° C. to 800° C. when fired to a temperature below about 1550° C.

12. The method of claim 9, wherein the article is fired to a temperature such that article has grains sized between about 10 microns and 100 microns.

13. The method of claim wherein the additive is selected from the group comprising $ZrO_2$, $K_2O$, $Li_2O$, $B_2O_3$, $CaF_2$, MgO, $TiO_2$, $MgTiO_3$ ZnO, $SnO_2$, SrO, $Y_2O_3$, $Fe_2O_3$, and BaO source powders.

14. The method of claim 13, wherein the additive is present in an amount of less than about 10 weight percent.

* * * * *

UNITED STATES PATENT AND TRADEMARK OFFICE
CERTIFICATE OF CORRECTION

PATENT NO. : 6,689,707 B1  Page 1 of 1
DATED : February 10, 2004
INVENTOR(S) : Beall et al.

It is certified that error appears in the above-identified patent and that said Letters Patent is hereby corrected as shown below:

<u>Title page</u>,
Item [57], ABSTRACT
Line 8, "1600°0 C" should be -- 1600°C --.

<u>Column 7,</u>
Line 1, "The method of claim wherein" should be -- The method of claim 9 wherein --

Signed and Sealed this

Eighteenth Day of May, 2004

JON W. DUDAS
*Acting Director of the United States Patent and Trademark Office*